Nov. 22, 1960    I. N. HUTCHINSON ET AL    2,961,203
HYDRAULIC BOOSTERS FOR AIRCRAFT
Filed Aug. 28, 1956    3 Sheets-Sheet 1
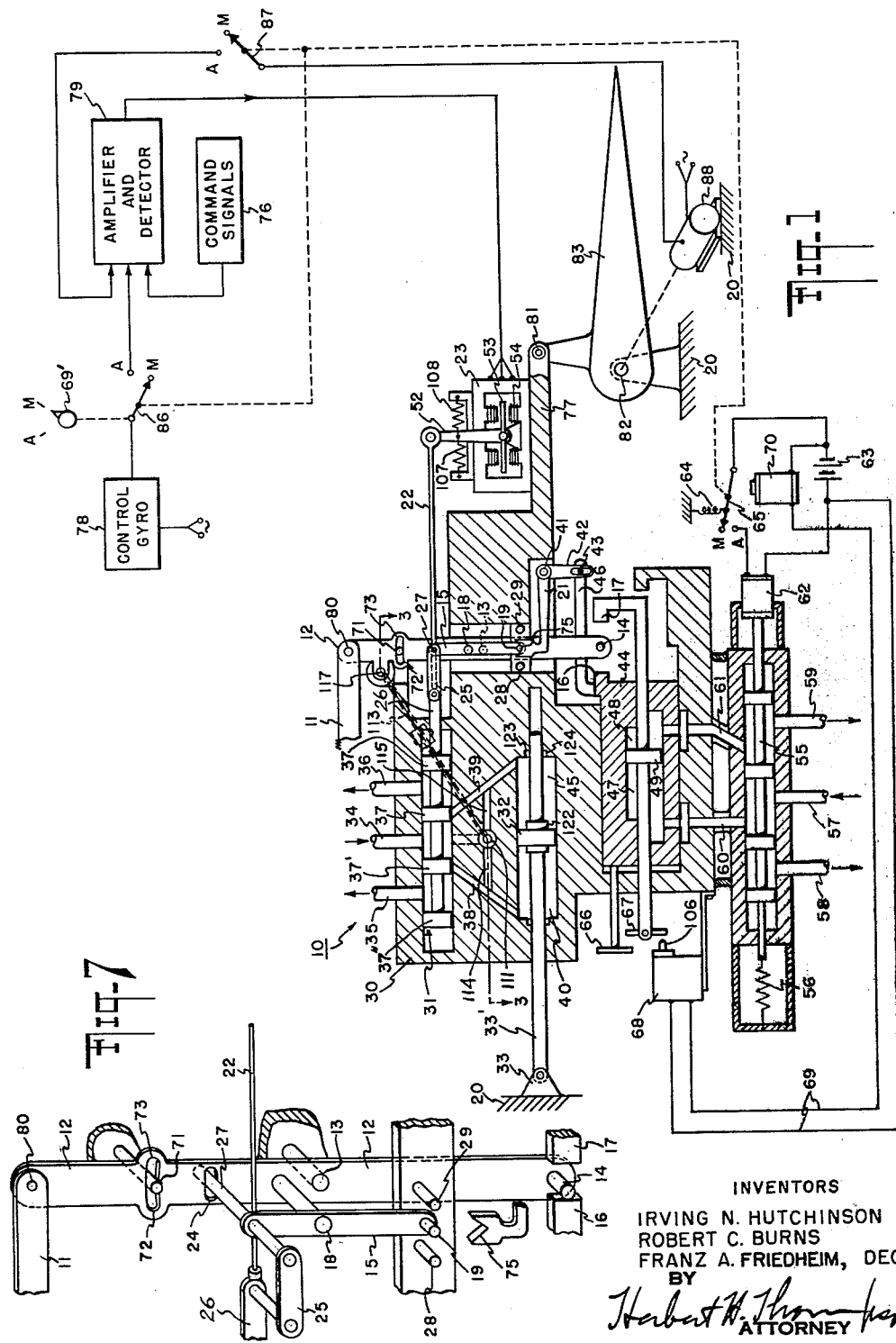
INVENTORS
IRVING N. HUTCHINSON
ROBERT C. BURNS
FRANZ A. FRIEDHEIM, DEC'D
BY
Herbert W. Thompson
ATTORNEY

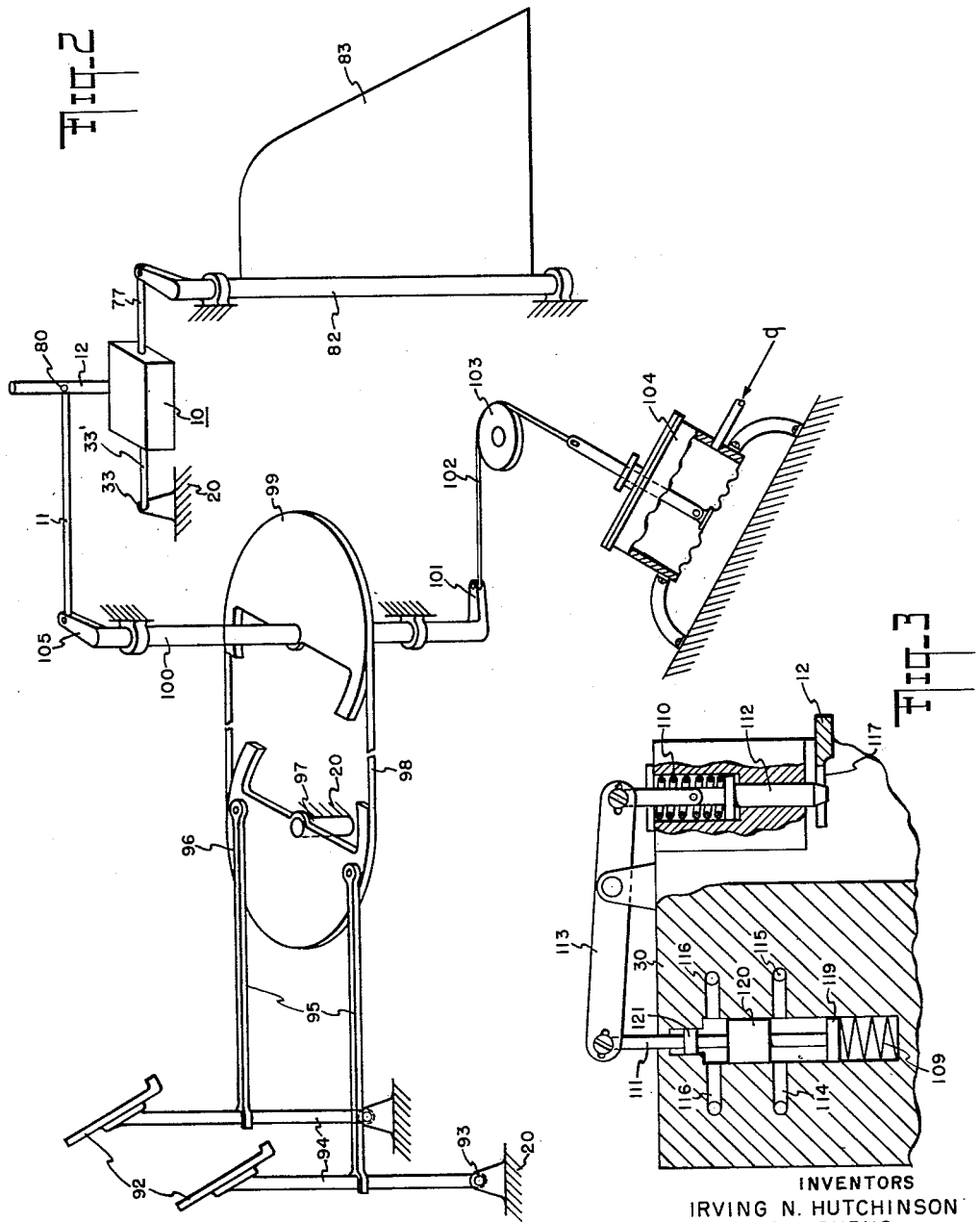

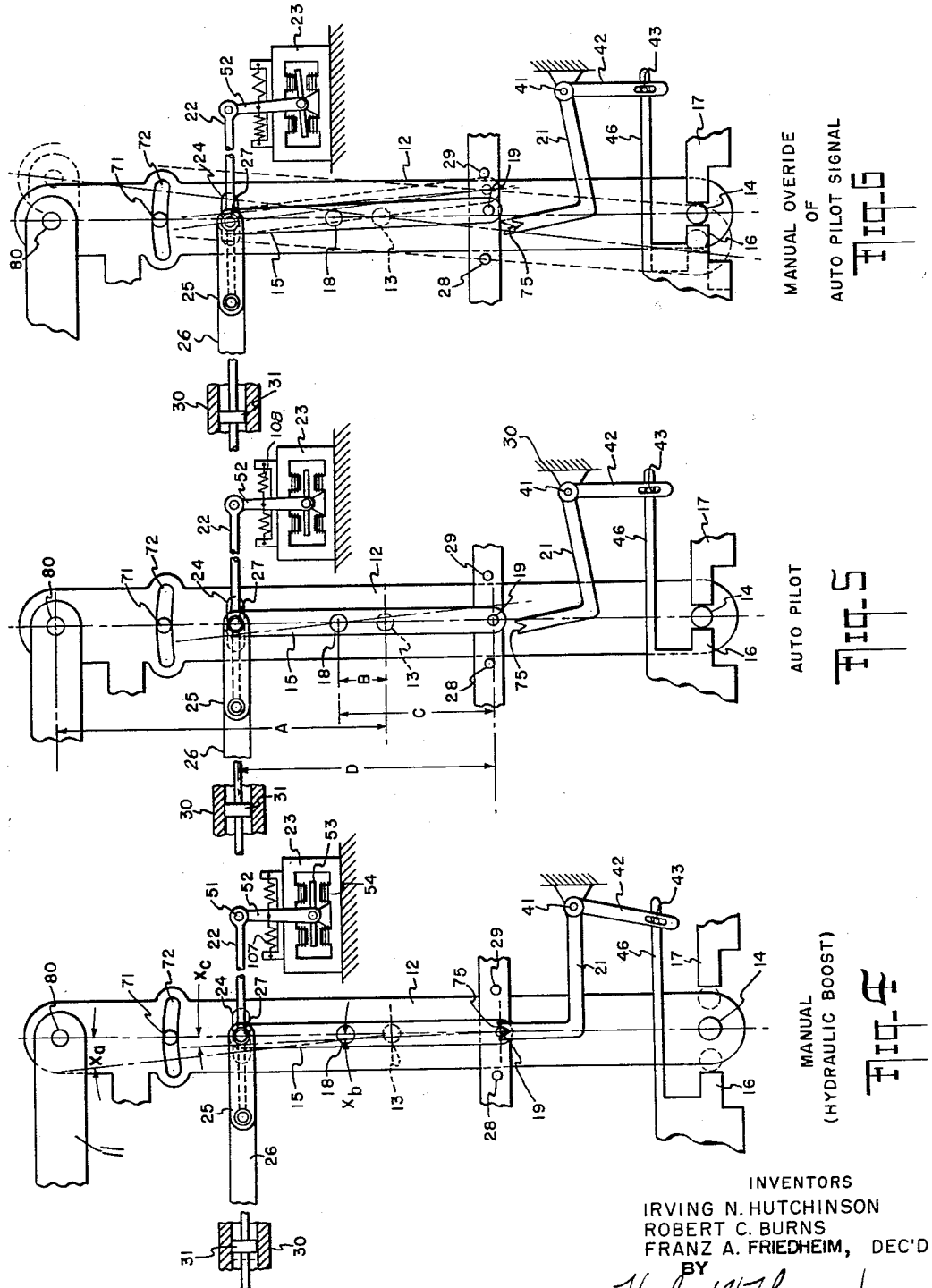

United States Patent Office 2,961,203
Patented Nov. 22, 1960

2,961,203

HYDRAULIC BOOSTERS FOR AIRCRAFT

Irving N. Hutchinson, Syosset, Robert C. Burns, Levittown, and Franz A. Friedheim, deceased, late of Elmhurst, N.Y., by The Chase Manhattan Bank, executor, New York, N.Y., assignors to Sperry Rand Corporation, a corporation of Delaware Filed Aug. 28, 1956, Ser. No. 610,040

6 Claims. (Cl. 244—78)

This invention relates to a hydraulic servo booster actuator system wherein the manual power control unit and the automatic pilot servo unit for positioning control surfaces of an aircraft are combined in one unit.

Due to the increase in speed and size of modern aircraft, the forces required for deflecting the control surfaces of the aircraft tax or exceed the human capabilities of the pilot. Hydraulic positioning systems for deflecting control surfaces are used to assist the pilot to move the controls of the aircraft. The hydraulic system of the instant invention contemplates use in an aircraft incorporating an automatic pilot mode of operation in addition to manual pilot operation. The control surfaces of the aircraft are moved in response to either a pilot manual input or a torque motor input, which inputs are fed to the servo booster actuator system of the instant invention. The torque motor receives its input electrical signal from the automatic pilot system. For either manual or automatic pilot operation, under normal conditions, the input signals are of a low power level, but the output signals from the booster system are at a high power level, the power amplification being obtained from the single booster actuator system.

It is, therefore, the principal object of the instant invention to provide a hydraulic positioning servo booster actuator system utilizing the same high power servo for both manual and automatic positioning of the aircraft control surfaces.

It is a further object of the instant invention to provide a servo booster actuator system responsive to low power level input signals for positioning the control surfaces of an aircraft for either manual pilot or automatic pilot operation.

It is a further object of the instant invention to provide a servo booster actuator hydraulic positioning system which permits the human pilot by means of the manual input mode of operation to override the automatic pilot should an emergency require that the human pilot countermand signals from the automatic pilot.

It is still a further object to provide a hydraulic system such that during the override operation the mechanical gain provided by the hydraulic system is changed in a manner to assist the human pilot in effecting large override signals regardless of automatic pilot commands.

It is still a further object of the instant invention to effect minimum friction loads on the torque motor of an aircraft hydraulic positioning system by use of a flexible wire link to connect directly the torque motor and servo levers of the system to the valve thereof; and furthermore to provide an emergency floating link to take up the function of the wire link to permit the application of large forces to the valve in the event of emergency conditions.

It is still a further object of the instant invention to provide a hydraulic positioning system for positioning aircraft control surfaces such that the servo thereof automatically connects the manual input lever linkage of the system directly to the control surfaces with no lost motion or backlash in the event of hydraulic fluid pressure failure.

More particularly, the present invention constitutes an improvement in and further development of the prior patent to Chenery and Newton, No. 2,678,177, dated May 11, 1954, for Manual Booster and Automatic Pilot Servo System.

Referring to the drawings in which a preferred form of the invention is shown,

Fig. 1 is a sectional view of our hydraulic actuator, together with a diagrammatic showing of the parts connected therewith;

Fig. 2 is a diagram showing the connection of our hydraulic actuator into the normal manual control system of an aircraft;

Fig. 3 is a section detail of the locking means permitting the human pilot to bypass the hydraulic booster and control the control surface directly;

Fig. 4 is an elevation of the several control levers and linkages operated both manually and from the automatic pilot, the parts being shown in the hydraulic booster position;

Fig. 5 is a similar view showing the same parts in the automatic pilot mode of operation;

Fig. 6 is a similar view showing the same parts in the manual override position; and Fig. 7 is a diagrammatic perspective view of the linkages shown in Figs. 4, 5 and 6.

Reference is now made to the figures in which a servo actuator booster system 10 incorporating the features of the instant invention is shown employed with an automatic pilot. The relatively fixed portions of the frame of the craft employing servo actuator booster system 10 are indicated by reference number 20. The assembly of booster system 10 includes a housing 30, a main valve spool 31, an actuator piston 32, and a control transfer actuator assembly. The control transfer actuator assembly includes a housing 44, a piston 49, and a transfer valve spool 55.

Piston valve 31 is arranged for lateral translation within the bore provided therefor in housing 30. Housing 30, in turn, is designed for horizontal translation relative to fixed actuator piston 32. Actuator piston 32, at its end 33, is attached to craft frame 20. The desired hydraulic power is obtained by porting oil from the aircraft hydraulic supply (not shown) connected to pipe 34 to piston chambers 40 and 45. The oil conduits to chambers 40, 45 include an input port or pipe 34, the channel of valve 31 between lands 37 and 37', and ports 38 and 39. A pair of exhaust pipes 35 and 36 are selectively coupled to actuator cylinders 40, 45 for the purpose of returning the exhaust fluid through the channels between lands 37" and 37' and between 37 and 37''' to a suitable sump (not shown).

Upon displacement of valve spool 31 to the left, oil from the aircraft hydraulic supply is ported to cylinder 40. Should port 38 be held in a fixed open position, oil would flow to cylinder 40 at a constant rate and thus produce motion of housing 30 to the left. However, the port opening is decreased as soon as actuator housing 30 starts moving. The flow of oil ceases when actuator housing 30 has travelled a distance equivalent to the initial valve displacement. In like manner, movement of valve spool 31 to the right ports oil to cylinder 45 and thus causes housing 30 to move to the right.

Reference 11 designates the element corresponding to the control stick or other steering member of the craft. A manual input lever arm 12 is rockably linked to steering member 11 at a pivot coupling 80. Arm 12 pivotally engages a pin 13. Pin 13 at its rear is integral with housing 30, which housing, as stated, is designed for lateral translation. A caging pin 14 is provided at the lower extremity of arm 12. A manual input limit stop 71 integral with housing 30 cooperates with spaced apart stop surfaces 72 and 73 of arm 12 to determine the rockable range of arm 12.

A valve lever arm 15 is pivotally supported in front of arm 12 by pin 18. Pin 18 extends horizontally from and is integral with arm 12 at a point above pivot pin 13. A caging pin 19 is provided at the lower extremity of arm 15. A pair of stop pins 28, 29 protrude from housing 30 and are located on opposite sides of caging pin 19. A flexible link 22 is attached to the extending end 26 of the valve spool 31. Link 22 passes through an internal bore at the upper extremity of arm 15. Link 22 is either clamped or threaded to arm 15 so that arm 15 and link 22 move in unison. A pin 27 extends horizontally from the upper extremity of arm 15 and engages an override pick-up slot 24 extending horizontally in lever arm 12 when the lost motion so provided is exceeded.

A torque motor 23 transmits lateral motion to valve spool 31 by way of a rockable link 52 connected to the right-hand end of flexible link 22. Link 52 rocks in unison with armature 53 of torque motor 23. A pair of centralizing springs 107 and 108 exert equal and opposite forces on link 52. The rocking motion of armature 53 depends upon the electric signals supplied to pole windings 54 in accordance with conventional operation of such a motor.

In order to provide for minimum friction loads on torque motor 23, flexible link 22 is used to connect torque motor 23 and the lever system to valve spool 31. A less yielding connection, however, is provided between the manual control lever 12 and the end 26 of the valve spool 31. This is shown in the form of a link 25 that connects the piston valve 31 with the pin 27 which engages not only the lever 15 at its top but also an override pick-up slot 24 in the main link 12. As explained hereinafter, during manual overcontrol lever 12 pivots about point 13 and will engage the pin 27 as soon as the limit of the lost motion provided by the slot 24 is reached so that when this occurs the manual input controls the valve regardless of the weaker force applied by the torque motor 23. Flexible wire 22 will, of course, buckle in case the opposing load thereon exceeds its linear rigidity.

The control transfer actuator assembly includes a housing 44 and an actuator piston 49 mounted slideably therein and a transfer valve having a valve spool 55. Housing 44 is designed for lateral translation within the bore provided therefor in housing 30. Piston 49 is designed for lateral translation within a bore provided therefor in housing 44. The bore for piston 49 defines a pair of fluid chambers 47 and 48 on either side of piston 49. Valve spool 55 is designed for horizontal translation within the bore provided therefor and regulates the fluid flow to the control actuator. The aircraft hydraulic supply (not shown) ports oil to chambers 47 and 48 by way of an input pipe 57, the bore for valve spool 55, and ports 60 and 61, respectively. A pair of exhaust pipes 58 and 59 serve to return the oil to a sump (not shown). A spring 56 normally exerts a tension force on spool 55.

A horizontal arm 46 extends from housing 44. Arm 46 is coupled by means of a pin and slot connection 43 to a vertical extension 42 of a caging arm 21. Caging arm 21 is pivoted at 41 for rockable motion. The upper extremity of arm 21 is provided with a bifurcated end 75 which is designed to engage caging pin 19 of lever arm 15. Upon displacement of arm 46 to the left, caging arm 21 pivots clockwise about 41 to cause bifurcated end 75 to cage pin 19. Disengagement from pin 19 is accomplished by displacement of arm 46 to the right.

A solenoid 62 is provided at the end of an external projection of the rod of valve spool 55. Solenoid 62, when it is energized, overcomes the force exerted by spring 56 and causes displacement of valve spool 55 to the right as viewed in Fig. 1. The circuit for solenoid 62 includes a D.C. source 63 and a switch blade 65 biased open by spring 64.

When switch blade 65 is in its upper position, it contacts the pole marked M, the position for manual operation of booster system 10. When switch blade 65 is connected to the lower pole marked A, it is in position for automatic pilot operation. A holding coil 70 is located adjacent blade 65. Holding coil 70, when energized by said source 63, serves to maintain blade 65 in automatic pilot position. A switch 68 and leads 69 complete the circuit for holding coil 70. Switch 68 has a depressible button 106 and it is in On or Closed circuit position when button 106 is depressed. Laterally movable stop plates 66 and 67 cooperate to close switch 68. Stop 66 is supported by a rod projecting laterally from housing 44 and through a bore therefor in housing 30. Plate 67 is pivoted at the end of a rod extending from piston 49 and through a bore therefor in housing 30.

The circuit for holding coil 70 is closed when concurrent displacements occur of housing 44 to the right and piston 49 to the left. When housing 44 and piston 49 complete their respective travels to the right for the former and to the left for the latter, plate 66 contacts the upper end of pivoted plate 67, whereas the lower end of pivoted plate 67 contacts and depresses button 106 of switch 68. Upon closing switch 68, coil 70 is energized and overcomes the spring force of spring 64 and maintains switch blade 65 in position for automatic pilot operation. Switch plate 65 is first inserted into automatic pilot operation position by the pilot who manually turns a ganged switch control 69'. Switch blade 65 is mechanically connected to control switch 69' and thus moves in unison therewith. The pilot has to hold control switch 69' and thus also blade 65 in automatic pilot position until coil 70 is energized. Were the pilot to release switch control 69' prior to the energization of coil 70, switch blade 65 would be snapped back to manual position by spring 64.

A horizontal caging stop 16 extends in alignment with caging pin 14 from housing 44. Stop 16 is adapted to abut against pin 14 upon disengagement of housing 44 to the right. Similarly, a caging stop 17 is designed to abut against the other side of pin 14. Stop 17 is carried at the end of the external extension of the rod of piston 49. Stop 17 is adapted to abut against pin 14 upon displacement of piston 49 to the left. Upon concurrent displacements of housing 44 and piston 49, the former to the right and the latter to the left, pin 14 is caged upon the abutments therewith of stops 16 and 17, and switch button 68 is closed to energize holding coil 70.

Reference is now made to the schematic illustration of Fig. 2. The human pilot controls the control surface displacement by pushing on a pair of pedals 92. Each pedal 92 is pivotally mounted along axis 93 to craft frame 20 by way of respective levers 94. A pair of rods 95 are rockably connected to respective levers 94 and to a front rudder quadrant 96. Rudder quadrant 96 is rotatably mounted on a support 97 which is fixed at its lower extremity to craft frame 20. Angular displacement of quadrant 96 about the axis of support 97 is transferred to a rear rudder quadrant 99 by way of a rudder cable 98. A revolvable torque tube 100 supports quadrant 99 and revolves in unison therewith. An arm 101 extends from the lower extremity of the tube 100 and is connected to a Q-spring 104 by way of a cable 102 and a pulley 103. The spring constant of Q-spring 104 is proportional to the dynamic air pressure and provides the human pilot with a feel of resisting force at pedals 92. The resisting force provided by Q-spring 104 is a function of air speed and pedal position, and compensates for change of attitude sensitivity of the craft for different speed.

At its upper extremity, tube 100 is provided with an arm 105 pivotally connected to link 11. Link 11, as noted hereinbefore, rockably connects the manual input lever 12 at 80. In Fig. 2, booster system 10 is shown encased. Arm 77 is shown schematically linked to an extension of control surface 83, which surface is mounted for rotation about its hinge axis 82.

Lateral displacement of arm 77 results in angular displacement of control surface 83 about axis 82. The rod 33' of the actuator piston 32 is shown schematically jutting from the other side of booster system 10 and is connected to craft frame 20 at pivot 33.

Booster system 10 serves to position an aircraft control surface 83 such as a rudder surface. Booster system 10 is also designed to effect automatic positioning of control surface 83 as part of the automatic pilot mode of operation. An automatic pilot is diagrammatically illustrated in Fig. 1 and includes a control gyro 78, an amplifier and detector circuit 79, a source of command signals 76, a master switch control 69' ganged to localized switches 65, 86 and 87, and a repeatback synchro or electrical selsyn transmitter 88. The control signal from gyro control 78 and the command signal 76 are fed into amplifier and detector 79. The command signals may be any input other than the pilot's manual input. The latter is preferably inserted into the system through booster actuator system 10. Upon throwing the control switch 69' into the "A" position (the automatic pilot mode of operation), the combined signals from control gyro 78 and command signals 76 are fed into amplifier and detector circuit 79. The D.C. output from amplifier and detector 79 is fed to torque motor 23. Repeatback synchro 88 has a stator fixed to craft frame 20. The rotor of synchro 88 is adapted to move in unison with control surface 83 because of a connection therebetween such as an extension of hinge axis 82. The repeatback signals from synchro 88 are fed to amplifier and detector 79 in opposition to the input signals thereto.

In the manual mode of operation, main switch control 69' is set to manual position M. Consequently, the ganged or auxiliary switches such as 65, 86 and 87 are thrown into their respective manual positions M. Such action opens the solenoid circuit and solenoid 62 is de-energized. Valve 55 is caused to move to the left by spring 56 which results in the porting of fluid to chamber 47 of caging piston 49. Piston 49 in turn is displaced to the right, while actuator housing 44 is displaced to the left. As a result, pin 14 is uncaged and arm 12 is free to pivot about pin 13 attached to housing 30. Displacement of sleeve 44 to the left also causes caging arm 21 to pivot clockwise so that its bifurcated upper end 75 cages pin 19 in midposition between stop pins 28, 29. In this condition, arm 15 is designed to pivot about pin 19 and serves as an idler which follows displacement of manual input arm 12. Motion of arm 12 is transferred to arm 15 by horizontal connection pin 18. Motion to valve 31 is applied by the human pilot when he inserts the manual signals by displacing pedals 92, as described earlier in connection with Fig. 2. Pedal displacement results in corresponding displacement of arm 12 about the axis of pin 13. Arm 15 follows in unison as it pivots about its caging pin 19. Since wire link 22 is attached to the upper extremity of arm 15, corresponding lateral motion is transmitted to wire 22, and thus to valve spool 31 and armature 53 of torque motor 23. Because wire link 22 is fastened firmly to armature 53, valve spool 31 and arm 15, no friction results by such motion. Wire link 22 flexes to allow for changes in geometry. Displacement of valve 31 causes housing 30 to follow accordingly as fluid is ported to the appropriate chamber 40 or 45, as the case may be. Motion of housing 30 is transmitted by way of arm 77 to surface control 83 to cause the latter to revolve about its hinge axis 82. Motion of housing 30 also provides a mechanical feedback. It will be understood that as housing 30 moves laterally, it carries pivot pin 13 attached thereto, which in turn swings arm 12 now about axis 80 to its initial position. Arm 15 follows in unison, and when the two arms are again aligned in their initial neutral position, valve 31 is closed and aircraft control surface 83 is in its new position. During normal manual operation of system 10, slot 24 is designed to pick up pin 27 at the same time arm 12 would hit limit stop 71.

In the manual mode of operation for a preferred embodiment of booster system 10, valve spool 31 is designed to travel about 1/13 the distance travelled laterally by pivotal coupling 80 along the horizontal such as horizontal axis of link 11. This may be seen by the following.

Lateral displacement of arm 12 at its upper extremity along a horizontal axis is designated as $x_a$ in Fig. 4. The corresponding horizontal displacement of the following arm 15 projected along a horizontal axis passing through pin 18 is designed as $x_b$; $x_b$ is a function of $x_a$ as follows:

$$x_b = \left(\frac{B}{A}\right) x_a \quad (1)$$

where A is the vertical distance between the axes of pivotal pin 80 and pivotal pin 13, and B is the vertical distance between the axes of pins 13 and 18. For clarity, dimensions A, B are shown in Fig. 5.

Displacement of valve spool 31 is designated at $x_c$ in Fig. 4, and it is a function of $x_b$ as follows:

$$x_c = \left(\frac{D}{C}\right) x_b \quad (2)$$

where C is the vertical distance between the axes of pins 18 and 19, and D is the vertical distance between the axes of pins 27 and 19. These dimensions are shown in Fig. 5.

Inserting Equation 1 into Equation 2, and providing link ratios such that $$\frac{B}{A} \text{ equals } \frac{1}{26} \text{ and } \frac{D}{C} \text{ equals } \frac{2}{1}$$

the ratio of valve movement $x_c$ to manual input movement $x_a$ is equal to 1:13. The maximum manual input is determined by limit stop 71 and the spacing between abutment edges 72, 73. For the preferred embodiment, the setting is such that the maximum manual input is ±.260 inch. Accordingly, the maximum valve opening for manual mode of operation is 1/13 of this travel or ±.020 inch.

In the automatic pilot mode of operation, the main switch control 69' is set to automatic pilot position A. Consequently, the ganged or auxiliary switches 65, 86 and 87 are thrown into their respective automatic positions A. Upon setting of the switches to A position, the circuit of solenoid 62 is closed and energized. This causes transfer valve spool 55 to displace to the right which results in the porting of fluid to chamber 48 of the control actuator piston 49. Piston 49 in turn is displaced to the left, whereas actuator housing 44 is displaced to the right. As a result, the button of switch 68 is depressed by stop 67. Consequently, the circuit of holding coil 70 is closed, and holding coil 70 becomes energized to maintain switch 65 in the A position. Concurrently therewith caging arms 16 and 17 converge upon caging pin 14. As a result, manual input arm 12 is caged to housing 30 (Fig. 5) and no longer is free to rotate. Furthermore, displacement of housing 44 pivots arm 21 counterclockwise so that pin 19 is uncaged. For automatic mode of operation, the pivotal axis of arm 15 is now pivot pin 18, and torque motor 23 is permitted to position valve spool 31. The limits of valve displacement for automatic pilot mode of operation is provided by pins 28, 29. For the preferred embodiment, pins 28, 29 are positioned to allow a horizontal displacement of arm 15 at its lower extremity of ±.014 inch. Since pin 18 is located midway between arm 15 (the ratio of $$\frac{D}{C}$$

is 2), the maximum permissible travel of valve spool 31 is ±.014 inch for automatic pilot mode of operation, about one half that permitted under manual control. In this particular mode of operation, arm 15 is an idler lever pivoted about pin 18. Since arm 12 is caged to housing 30, the manual input system including pedals 92 is carried along to assume the positions imposed by the booster system in accordance with the signals imposed by the autopilot.

The input signals from the autopilot are fed to torque motor 23. The signals are then communicated by way of link 22 to valve spool 31. Movement of valve spool 31 causes corresponding translation of housing 30 and thus rotates control surface 83 about its hinge line 82 by virtue of the connection with arm 77. Feedback signals from synchro 88 maintain control surface 83 in its new position when such position is reached. The converging forces of caging arms 16 and 17 against pin 14 create a hydraulic preload which is reflected back to pedals 92. The hydraulic preload resists movement of pedals 92. In the preferred embodiment of a system, the preload is designed to be 100 pounds at pedals 92.

Booster system 10 includes overcontrol means which permits the human pilot to override the electrical command signals of the automatic pilot. To override the automatic pilot, the pilot pushes on the appropriate pedal 92 with a force such that the sum of this applied force and the force established by Q-spring 104 exceeds the maximum hydraulic load of 100 pounds. Application of an overriding force on pedal 92 causes corresponding motion of link 11 and thus pivots lever arm 12 about pin 13. For the purpose of explaining the overriding mode of operation, arms 12 and 15 in Fig. 6 are shown in full lines to illustrate their positions prior to the application of the overriding force and in broken lines to illustrate their positions after the overriding force is applied thereto. Furthermore, for the purpose of illustration, a clockwise rotation is shown applied to arm 12 which causes it to pivot about pin 13. As a result pin 14 pushes against and causes lateral motion of caging stop 16 to the left. Motion of arm 12 is communicated by horizontal pin 18 to lever arm 15. Since pin 18 is above the axis of rotation, it undergoes a horizontal motion to the right which swings pin 19 (note Fig. 6) of arm 15 to the right. At the start of the overriding mode of operation, pin 19 is uncaged whereas the upper extremity of lever arm 15 is held relatively stationary because of the force exerted thereat by torque 23, which during the automatic pilot mode of operation is the positioning device. Accordingly, arm 15 pivots counterclockwise about its upper end.

As arm 15 is rotated further, its lower extremity soon strikes stop pin 29. Further clockwise motion of arm 12 now causes arm 15 to pivot clockwise about stop pin 29 with the result that valve spool 31 (and the armature of torque motor 33) moves to the right at a 1:13 lever ratio and thus provide the desired overriding control against torquer 23. A full valve opening, i.e., .020 inch, during an emergency override operation is made possible by engagement of horizontal pick-up slot 24 with pin 27 extending from the top of arm 15. This insures that valve spool 31 is hardover when input lever arm 12 is hardover so that quick override is assured. When the lower extremity of arm 15 is held against stop pin 29 during the override operation, the pick-up of pin 27 by slot 24 is designed to occur just after valve spool 31 has passed its mid-position at the 1:13 lever ratio. From this pick-up point on, the lever ratio, i.e., movement of valve spool 31 to movement of manual input arm 12, is approximately 1:2. This ratio is determined by the distance between pin 80 to pin 13 on one hand and the distance between pin 27 and pin 13 on the other hand. Change of the lever ratios just after valve spool 31 passes its neutral mid-position also insures positive and quick override. With further movement of valve spool 31 at the higher level ratio of 1:2, arm 15 pivots clockwise about the axis of pin 13. Consequently the lower extremity of arm 15 is carried away from stop pin 29 and winds up midway between stop pins 28, 29 when valve 31 is hardover.

As a safety measure, servo booster actuator system 10 is provided with an emergency manual mode of operation in the event the hydraulic supply fails. For such operation, the pilot can deflect directly the control surface 83 through pedals 92. Referring to Fig. 3, a bypass plunger 111 having lands 119, 120 and 121 is provided for up and down motion in a bore provided therefor in housing 30. A locking pin 112 is provided with a lower end adapted to engage an opening 117 in manual input arm 12. Locking pin 112 and plunger 111 are coupled together by a rocker arm 113 to insure simultaneous operation. Upon engagement of pin 112 with opening 117, arm 12 is locked to housing 30 and thus provides the pilot with a direct mechanical connection to control surface 83 without backlash. A pair of ports 114 and 115 bypass main fluid chambers 40 and 45. Rear ports 116 connect to the hydraulic fluid supply in a manner not shown. A pair of tension springs 109 and 110 exert forces, respectively, upward against plunger 111 and downward against pin 112.

During normal operation of booster system 10, fluid from the hydraulic supply is admitted by way of ports 116 to the chamber between lands 120 and 121. A downward force is generated thereat since the piston area of land 120 is greater than the area of land 121. When this force exceeds the combined spring force generated by springs 109 and 110, bypass plunger 111 is forced downwardly causing land 120 to block bypass ports 114 and 115 and at the same time withdraws locking pin 112 from opening 116. In the event of failure of hydraulic supply, the downward force at the chamber between lands 120, 121 is no longer generated. Consequently bypass plunger 111 is forced upward by reason of the combined action of springs 109, 110 with the result that ports 114 and 115 are connected. This permits the fluid to bypass the main piston chambers 40, 45 and avoid hydraulic lock therein. Hence, in case of failure of hydraulic pressure during booster operation (either with automatic pilot control or as manual assistance), the booster and hence the automatic pilot if in operation becomes inoperative and the controls released for direct manual operation without load from the hydraulic system. Upon restoration of the hydraulic supply, plunger 111 is urged downward and ports 114, 115 are closed.

While we have described our invention in its preferred embodiments, it is to be understood that the words which we have used are words of description rather than of limitation and that changes within the purview of the appended claims may be made without departing from the true scope and spirit of our invention in its broader aspects.

What is claimed is:

1. In a hydraulic booster for the control surfaces of aircraft having both a manual input member and an automatic pilot input member, a main hydraulic stationary piston, a movable cylindrical housing therefor having mounted thereon said booster input members, a valve controlling the flow of fluid to said main cylinder and mounted in said housing, said valve being operatively connected to both input members through a pair of levers, the primary of said levers being pivoted on said housing and connected to the manual input member and the secondary lever being pivoted on said primary lever and connected to said automatic pilot input member, caging means for engaging said secondary lever at a fixed point with respect to said housing during manual control of the booster, means for caging said primary lever at a fixed point with respect to said housing during automatic pilot control of the booster, and transfer means connected to said primary lever caging means and secondary lever caging means operable to release the primary lever caging means during manual control of the booster and to release the secondary lever caging means during automatic pilot control of the booster.

2. A hydraulic booster as claimed in claim 1, in which the caging means for the primary lever engaged in automatic pilot control is yieldable to overriding pressure on said manual input member, and the primary lever is effective through the secondary lever to manually displace said control valve.

3. In a hydraulic booster for the control surfaces of aircraft having both a manual input member and an automatic pilot input member, a main hydraulic stationary piston, a movable cylindrical housing therefor, the latter being connected to a control surface and having said automatic pilot input member mounted on the housing, a primary valve and cylinder controlling the flow of fluid to said main cylinder and mounted in said housing, said valve being connected to both said input members through a pair of levers, the primary of said levers being pivoted on said housing and connected to the manual input member, and the secondary lever being pivoted on said primary lever and connected to said automatic pilot input member, caging means for engaging said secondary lever at a fixed point with respect to said housing, caging means for engaging said primary lever at a fixed point with respect to said housing, a second cylinder and piston in said housing operatively connected to said primary and secondary lever caging means, and a second valve in said housing for porting fluid to said second cylinder to release the caging means for the primary lever and engage the caging means for the secondary lever in manual booster control and to engage the caging means for the primary lever and release the caging means for the secondary lever in automatic pilot booster control.

4. In a hydraulic booster for the control surfaces of aircraft, a manual input member for the booster, an alternative automatic pilot input member for the booster, a booster housing having a control valve operated by both said manual and automatic pilot input members, a pair of levers connecting said input members and valve comprising a primary lever pivoted on said housing connected to said manual input member and a secondary lever pivoted on said primary lever connected to said automatic pilot input member, first means for caging said secondary lever at a fixed point with respect to the housing during manual control of the valve, second means for caging said primary lever at a fixed point with respect to the housing during automatic pilot control of the valve, and transfer means for said first and second caging means operable to release the primary lever during manual control of the valve and to release the secondary lever during automatic pilot control of the valve.

5. A hydraulic booster as claimed in claim 4, in which the second caging means is yieldable to overriding pressure on said manual input member, and the secondary lever is operated by the primary lever to manually displace said control valve.

6. A hydraulic booster as claimed in claim 4, in which stops are provided in the path of said secondary lever, the second caging means is yieldable to overriding pressure on said manual input member, and the secondary lever is operated by the primary lever to engage the stops and manually displace said control valve.

References Cited in the file of this patent

UNITED STATES PATENTS

| | | |
|---|---|---|
| 2,487,116 | Eaton | Nov. 8, 1949 |
| 2,627,847 | Clark et al. | Feb. 10, 1953 |
| 2,638,289 | McKellar et al. | May 12, 1953 |
| 2,678,177 | Chenery et al. | May 11, 1954 |
| 2,705,940 | Edwards | Apr. 12, 1955 |
| 2,773,660 | Rasmussen | Dec. 11, 1956 |
| 2,801,618 | Place et al. | Aug. 6, 1957 |
| 2,859,926 | Westbury | Nov. 11, 1958 |